June 13, 1939.  J. P. BOYCE  2,162,241
FISHING DEVICE
Filed April 22, 1938
Fig. 1
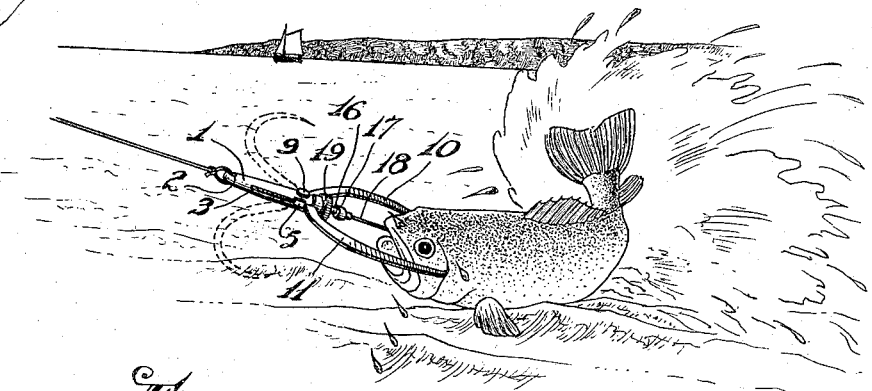
Fig. 2
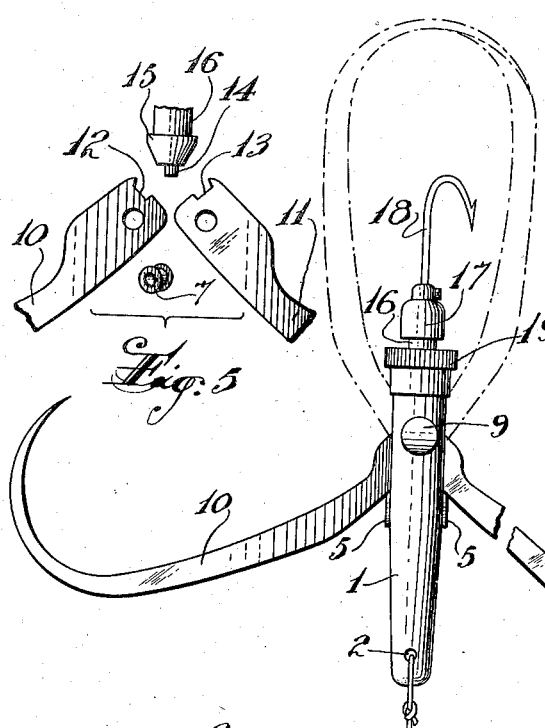
Fig. 3
Fig. 6
Fig. 5
Fig. 4
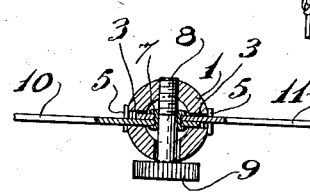
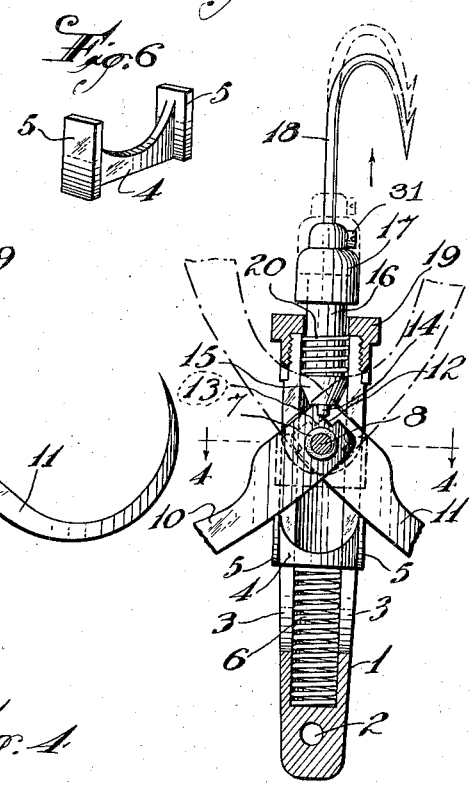
INVENTOR
John Paul Boyce
BY Frank C. Fischer
ATTORNEY Patented June 13, 1939

2,162,241

UNITED STATES PATENT OFFICE 2,162,241

FISHING DEVICE

John Paul Boyce, Newark, N. J., assignor to Henry Kratz, Newark, N. J.

Application April 22, 1938, Serial No. 203,517

5 Claims. (Cl. 43—89)

This invention relates to improvements in fishing hooks and trapping devices.

It frequently happens that in fishing, the fish is insecurely hooked and frees itself. This is due to the present forms of hooks now in common use which are not provided with means for assuring a firm grip on the fish after it has been hooked.

It is an object of this invention to provide a fishing hook and trapping device which in addition to having a hook for catching the fish is provided with tongs which securely grasp both sides of the fish and prevents the fish from freeing itself.

A further object of the invention is the provision of a fishing and trapping device for firmly securing a fish, which device is of simple structure and easily manipulated.

These and other advantageous objects, which will later appear, are accomplished by the simple and practical construction and arrangement of parts hereinafter described and exhibited in the accompanying drawing, forming part hereof, and in which:

Fig. 1 is a perspective view of a fishing hook and trapping tong embodying my invention, Fig. 2 is a plan view of the device, Fig. 3 is a sectional view showing details of the device, Fig. 4 is a sectional view taken on line 4—4 of Fig. 3, Fig. 5 is an exploded view showing more clearly the structure of certain members of the device, and Fig. 6 is a perspective view of an element of the device.

Referring to the drawing, in Figs. 2 and 3, the fishing hook and trapping tongs are shown to comprise a tubular casing 1, having an aperture 2 in one end thereof to receive a fishing line. The walls of the casing are provided with guide slots 3 in which slidably moves a rider 4 having flanges 5 engaging the outer walls of the casing. A compression spring 6 is positioned in the casing and bears against the rider 4, constantly urging the latter upward. Supported by the walls of casing 1 is an eyelet 7 through which passes a bolt 8 having a head 9. Rotatably supported by the eyelet 7 are a pair of tongs 10 and 11, which have adjacent the eyelet, notches 12 and 13 adapted to engage a projection 14 on a wedge-shaped member 15, the latter forming the extremity of a rod 16 which has a head 17 by means of which there can be detachably secured a fish hook 18 by a set screw 31. The casing is provided with a cap 19 against which bears a compression spring 20, the lower end of which also engages the member 15 and normally tends to move the projection 14 downwardly into the notches 12 and 13 of the prongs 10 and 11.

When the projection 14 lies within the notches 12 and 13 of the prongs 10 and 11, the tongs are prevented from rotating to the position shown in dotted lines in Fig. 2, and are held in the position shown in Fig. 2.

In operation, in order to set the device, the tongs 10 and 11 are pulled downward, see Fig. 2, against the flanges 5 of the rider 4 and against the action of the compression spring 6. As the tongs are pulled downwardly the projection 14 is forced by the compression spring 20 to enter 15 the notches 12 and 13, and thus hold the tongs in the open condition as shown in Fig. 2.

Now, when a fish engages the hook 18 and pulls thereon against the action of spring 20, the projection 14 is moved out of the notches 12 and 13 and the compression spring 6 rapidly moves the tongs to a trapping position as shown in dotted lines in Fig. 2 and as shown in full lines in Fig. 1, thus securely trapping the fish and preventing it from freeing itself from the hook.

From the above description it will be seen that there has been provided a simple and effective device for preventing a fish from freeing itself from a fishing hook, which device is of such a structure that it will not mutilate the fish.

While the device herein has been described with special reference to the catching of fish, it is obvious that it might also be used effectively for the trapping of small animals or the like.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. In a fishing device of the character described, a tubular casing having a pair of oppositely arranged guide slots in the walls thereof, a rider slidably mounted in said slots, a compression spring positioned in the casing and tending to normally urge the rider towards one end of the casing, a pair of tongs pivotally supported by the casing, said tongs having notches therein and bearing against said rider, a rod slidable in the casing and having a projection thereon, a compression spring encircling said rod and tending to normally move the projection into the notches in said tongs, and a fishing hook detachably secured to said rod.

2. In a fishing device of the character described, a casing, a rider slidably mounted in said casing, means in the casing for guiding said rider, a compression spring positioned in the casing and tending to normally urge the rider towards one end of the casing, a pair of tongs pivotally supported by the casing and having notches therein and bearing against said rider, a rod slidable in the casing and having a fish hook detachably secured thereto, and detent means carried by said rod and adapted to engage said notches to hold the tongs in an open condition.

3. In a fishing device of the character described, a casing, a rider slidably mounted in said casing, spring means positioned in the casing and normally urging the rider towards one end of the casing, a pair of tongs pivotally supported by the casing, said tongs bearing against said rider and having notches therein adjacent their pivots, a rod slidably mounted in the casing and having means thereon to enter said notches, and spring means encircling said rod and normally holding the means on said rod in the notches to hold the tongs in an open condition.

4. In a fishing device of the character described, a casing, a rider slidably mounted in the casing, a compression spring positioned in the casing tending normally to urge the rider towards one end of the casing, a bolt threaded through the walls of said casing, an eyelet mounted on said bolt, a pair of tongs pivotally supported by said eyelet, said tongs having notches therein and bearing against said rider, a rod slidably mounted in the casing and having a fishing hook detachably secured thereto, said rod having a projection on one end thereof adapted to enter said notches to hold the tongs in an open condition, and a compression spring encircling said rod tending to normally move the projection into said notches.

5. In a fishing device of the character described, a casing, a rider slidably mounted in the casing, a compression spring positioned in the casing tending to normally urge the rider towards one end of the casing, a bolt threaded through the walls of said casing, a pair of tongs, means for pivotally supporting said tongs on said bolt, said tongs having notches therein and bearing against said rider, a rod slidably mounted in the casing and having a fishing hook secured thereto, said rod having a projection on one end thereof adapted to enter said notches to hold the tong in an open condition, and a compression spring encircling said rod tending to normally move the projection into said notches.

JOHN PAUL BOYCE.